United States Patent [19]

Bohme et al.

[11] 3,718,659

[45] Feb. 27, 1973

[54] 5-ARYL-3H-1,2,4-DITHIAZOLES AND PROCESS FOR THEIR MANUFACTURE

[75] Inventors: Horst Bohme; Kurt-Henning Ahrens, both of Frankfurt/Main, Germany

[73] Assignee: Farbwerke Hoechst Aktiengesellschaft vormals Meister Lucius & Bruning, Frankfurt am Main, Germany

[22] Filed: Sept. 1, 1970

[21] Appl. No.: 68,776

[30] Foreign Application Priority Data

Sept. 11, 1970 Germany..................P 19 45 968.8

[52] U.S. Cl...........260/302 R, 260/551 R, 424/200, 424/232, 424/270
[51] Int. Cl. ............................................C07d 91/70
[58] Field of Search ..................................260/302 R

[56] References Cited

UNITED STATES PATENTS 3,536,756   10/1970   Zumach et al........................260/302

Primary Examiner—Alex Mazel
Assistant Examiner—R. J. Gallagher
Attorney—Curtis, Morris & Safford

[57] ABSTRACT

5-Aryl-3H-1,2,4-dithiazoles of the formula I

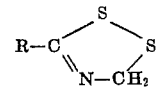

in which R is an aromatic radical which may be unsubstituted or mono-, di- or tri-substituted in meta- or para-position by lower alkyl, trifluoromethyl, lower alkoxy, benzyloxy, halogen, nitro, hydroxy, lower acyl, carboxy, lower carbalkoxy or carbobenzoxy, and their physiologically tolerable salts, active against fungi. A process for preparing these compounds.

9 Claims, No Drawings

5-ARYL-3H-1,2,4-DITHIAZOLES AND PROCESS FOR THEIR MANUFACTURE

The present invention provides 5-aryl-3H-1,2,4-dithiazoles of the formula I

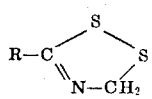

in which R is an aromatic radical which may be unsubstituted or mono-, di- or tri-substituted in meta- or para-position by lower alkyl, trifluoromethyl, lower alkoxy, benzyloxy, halogen, nitro, hydroxy, lower acyl, carboxy, lower carbalkoxy or carbobenzoxy, as well as physiologically tolerable salts thereof.

This invention furthermore relates to a process for the manufacture of these dithiazoles, which comprises reacting the corresponding N-hydroxymethyl-thiocarboxylic acid amides of the formula II

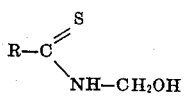

in which R has the meaning given above, with thionyl chloride, optionally saponifying ester groups present and/or converting the products obtained into the physiologically tolerable salts thereof.

The reaction is carried out in the absence of moisture and under an atmosphere of a protective gas, preferably dry nitrogen, in an inert solvent, preferably benzene or toluene. The ring closure reaction is exothermic and is advantageously carried out at temperatures of from 0° to 50° C. The reaction yields the hydrochlorides of the corresponding dithiazoles of the formula I, which may be precipitated, if necessary, by adding an non-polar solvent. The crude hydrochlorides can be converted into the free bases of the formula I with tertiary amines, for example with triethylamine or N-ethyl-diisopropylamine, in an ether solution. The products may be purified by distillation or recrystallization.

In particular R in formula I may have the following meanings:
4-fluoro-, 2-chloro-, 3-chloro-, 4-chloro-, 2-bromo-, 3-bromo-, 4-bromo-, 2,4-dichloro-, 3,4-dichloro-, 2-,3- or 4-trifluoromethyl, 2-chloro-4-trifluoromethyl-, 2-methyl-, 4-methyl-, 4-ethyl-, 2,3-dimethyl-, 2,4-dimethyl-, 2,5-dimethyl-, 3-nitro-, 4-nitro-, 2-methoxy-, 4-methoxy-, 4-ethoxy-, 2,3-, 3,4-, or 3,5-dimethoxy-, 3,4-methylenedioxy-, 3,4,5-trimethosy-, 3-hydroxy-, 4-hydroxy-, 4-carbethoxy-, 4-carboxy-, 4-benzoyl-phenyl, furthermore α- and β-naphthyl. The n-hydroxymethyl-thiocarboxylic acid amides of the formula II can be prepared in known manner from the corresponding thioamides with formaldehyde (Archiv fuer Pharmazie 300 (1967), page 241).

The 5-aryl-3H-1,2,4-dithiazoles of the formula I are stable water-insoluble compounds which are, however, soluble in carbon tetrachloride, chloroform, ether, alcohol and other polar solvents.

Generally they form stable salts with acids.

The products of the invention have a fungistatic and fungicidal activity against a great variety of human and animal pathogenic fungus strains, such as skin, budding and rotting fungi, as well as against fungi on vegetable matter. The minimum inhibition concentrations are from 0.2 to 2 γ/ml against dermatomyces and from 4 to 8 γ/ml against Candida *albicans* and *Aspergillus niger*. The examination in the animal test demonstrated a very good local action against the experimental trichophytosis in the Guinea pig.

Serum factor and toxicity are low. The $LD_{50}$ of the compounds is in the range of 500 mg/kg or more, when administered orally or subcutaneously to the white mouse.

Owing to their properties, the products of the invention or their physiologically tolerable salts may be used for the local treatment of skin and mucosa mycoses; they may, furthermore, be employed as pesticides against plant pathogenic fungi. Suitable therapeutical dosage unit forms are liquid and semisolid compositions, such as solutions in alcohol and other solvents which do not irritate the skin; sprays, tinctures, ointments, creams, gels, jellies, furthermore powders and dragees. The active ingredient concentrations are from about 0.1 to 2 percent.

As physiologically tolerable acids suitable for the salt formation there may be mentioned: Hydrohalic acids, such as hydrochloric acid and hydrobromic acid, sulfuric acid, phosphoric acid, amidosulfonic acid, acetic acid, propionic acid, lactic acid, glycolic acid, gluconic acid, fumaric acid, maleic acid, oxalic acid, succinic acid, tartaric acid, benzoic acid, salicylic acid, citric acid, aceturic acid, hydroxyethane-sulfonic acid, ethylene-diamine-tetracetic acid, embonic acid, naphthalene-sulfonic acid or toluene-sulfonic acid.

The following examples serve to illustrate the invention.

EXAMPLE 1

5-Phenyl-3H-1,2,4-dithiazole

In the absence of moisture and under a nitrogen atmosphere a solution heated to 50° C and consisting of 16.7 g of N-hydroxymethyl-thiobenzamide in 200 ml of anhydrous benzene was added dropwise while vigorously stirring to a mixture of 20 g of thionyl chloride and 50 ml of benzene. The temperature in the reaction vessel did not exceed 60° C. When a light-yellowish hydrochloride precipitated, stirring was continued for 2 hours; the product was then suction-filtered, washed with benzene and dried in vacuo. Yield: 9.5 to 10.8g. The crude product was crushed and suspended in 100 ml of anhydrous ether. An equimolar amount of triethylamine in a small amount of ether was added dropwise at 0° C. Triethylammonium chloride was suction-filtered, the ether solution was neutralized with dilute hydrochloric acid, the product obtained was washed with water dried and fractionated. At a temperature of from 86° to 88° C under a pressure of $10^{-2}$ torr, 6.9 g of an orange oil were obtained. This oil was soluble in ether, ethanol, chloroform and polar solvents and insoluble in water. $n_D^{20} = 1.683$.

Analysis: $C_8H_7NS_2$ (molecular weight: 181.3)
calc: C 52.99; H 3.89; N 7.73; S 35.37
found: C 52.99; H 3.87; N 7.78; S 35.34

EXAMPLE 2

5-(4'-Methylphenyl)-3H-1,2,4-dithiazole

The compound was obtained in the manner disclosed in Example 1. Owing to the poor solubility of the N-hydroxy-methyl-4-methyl-thiobenzamide a mixture of toluene/benzene (1:3) was used. Nine grams of the starting material were dissolved at about 80° C in 200 ml of this mixture, the solution was then cooled to 40° C and added dropwise to 11 g of thionyl chloride. The base was set free in ether with N-ethyl di-isopropyl amine. After washing and neutralization the ether phase was concentrated. The precipitated yellow crystals were recrystallized from ether/pentane. 3.4 g of yellow leaflets were obtained, m.p. 52°–53° C.

Analysis: $C_9H_9NS_2$ (molecular weight: 195.3)
calc: C 55.35 H 4.65 N 7.17
found: 55.59 5.05 7.25

EXAMPLE 3

5-(4'-Chlorophenyl)-3H-1,2,4-dithiazole

N-hydroxymethyl-4-chloro-thiobenzamide was suspended in toluene and the suspension was reacted at 0° C as disclosed in Example 1. The base which was set free with N-ethyl-diisopropyl amine in ether formed yellow crystals, m.p. 67° C (recrystallization from carbon tetrachloride).

Analysis: $C_8H_6ClNS_2$ (molecular weight: 215.7)
calc: C 44.54; H 2.80; N 6.50; S 29.73
found: C 44.79; H 2.83; N 6.27; S 29.66

In an analogous manner there were obtained:

4. 5-(3'-methoxyphenyl)-3H-1,2,4-dithiazole, m.p. 53°–54 C
5. 5-(4'-methoxyphenyl)-3H-1,2,4-dithiazole, m.p. 67° C
6. 5-(4'-benzyloxy-phenyl)-3H-1,2,4-dithiazole, m.p. 118° C
7. 5-(4'-n-butoxy-phenyl)-3H-1,2,4-dithiazole, m.p. 55° C

We claim:

1. A 5-aryl-3H-1,2,4-diathiazole of the formula

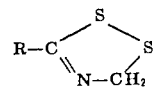

in which R is a member selected from the group consisting of α-naphthyl, β-naphthyl, phenyl and phenyl mono-, di- or tri-substituted by fluoro, chloro, bromo, trifluoromethyl, methyl, ethyl, methoxy, ethoxy, butoxy, nitro, methylene-dioxy, hydroxy, carbethoxy, carboxy or benzoyl, and a physiologically tolerable salt thereof.

2. 5-Phenyl-3H-1,2,4-dithiazole.
3. 5-(4'-Methylphenyl)-3H-1,2,4-dithiazole.
4. 5-(4'-Chlorophenyl)-3H-1,2,4-dithiazole.
5. 5-(3'-Methoxyphenyl)-3H-1,2,4-dithiazole.
6. 5-(4'-Methoxyphenyl)-3H-1,2,4-dithiazole.
7. 5-(4'-Benzyloxy-phenyl)-3H-1,2,4-dithiazole.
8. 5-(4'-n-butoxy-phenyl)-3H-1,2,4-dithiazole.

9. A process for the manufacture of 5-aryl-3H-1,2,4-dithiazoles as defined in claim 1, which comprises reacting the corresponding N-hydroxymethyl-thiocarboxylic acid amides of the formula II

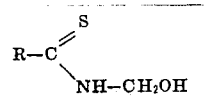

* * * * *